July 23, 1935.  S. A. REED  2,008,771
AUTOMATIC VARIABLE PITCH PROPELLER
Filed Jan. 9, 1935  3 Sheets-Sheet 1
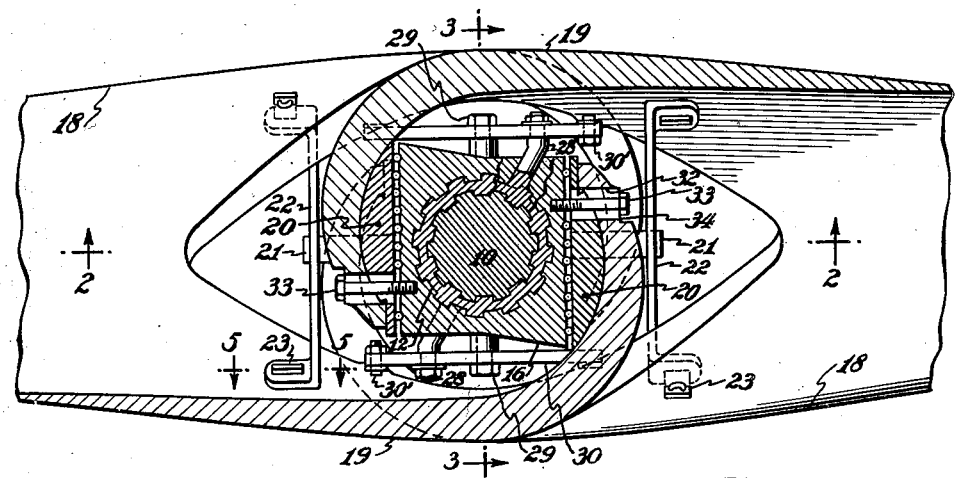
Fig. 1.
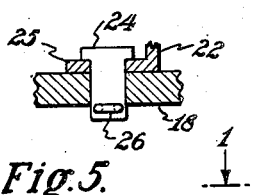
Fig. 5.
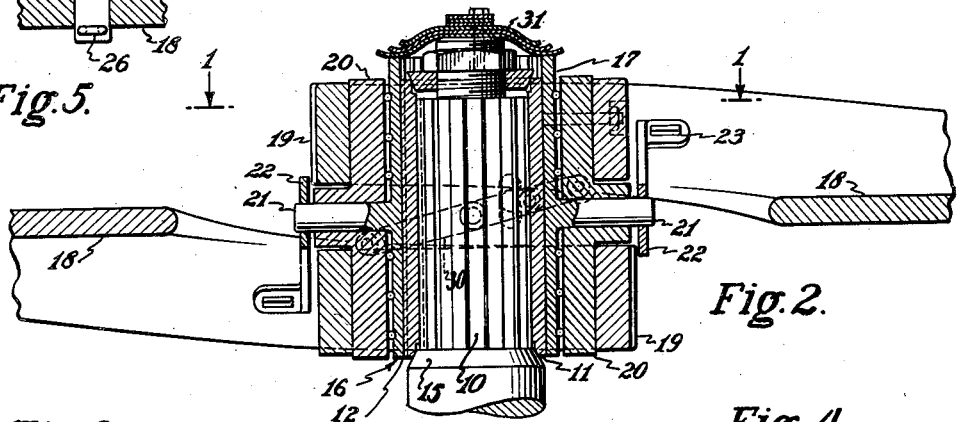
Fig. 2.
Fig. 3.  Fig. 4
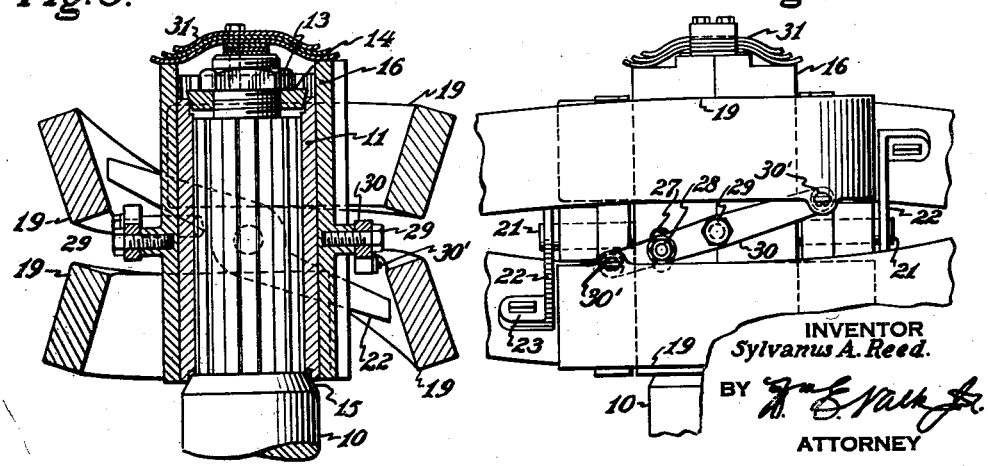
INVENTOR
Sylvanus A. Reed.
BY 
ATTORNEY

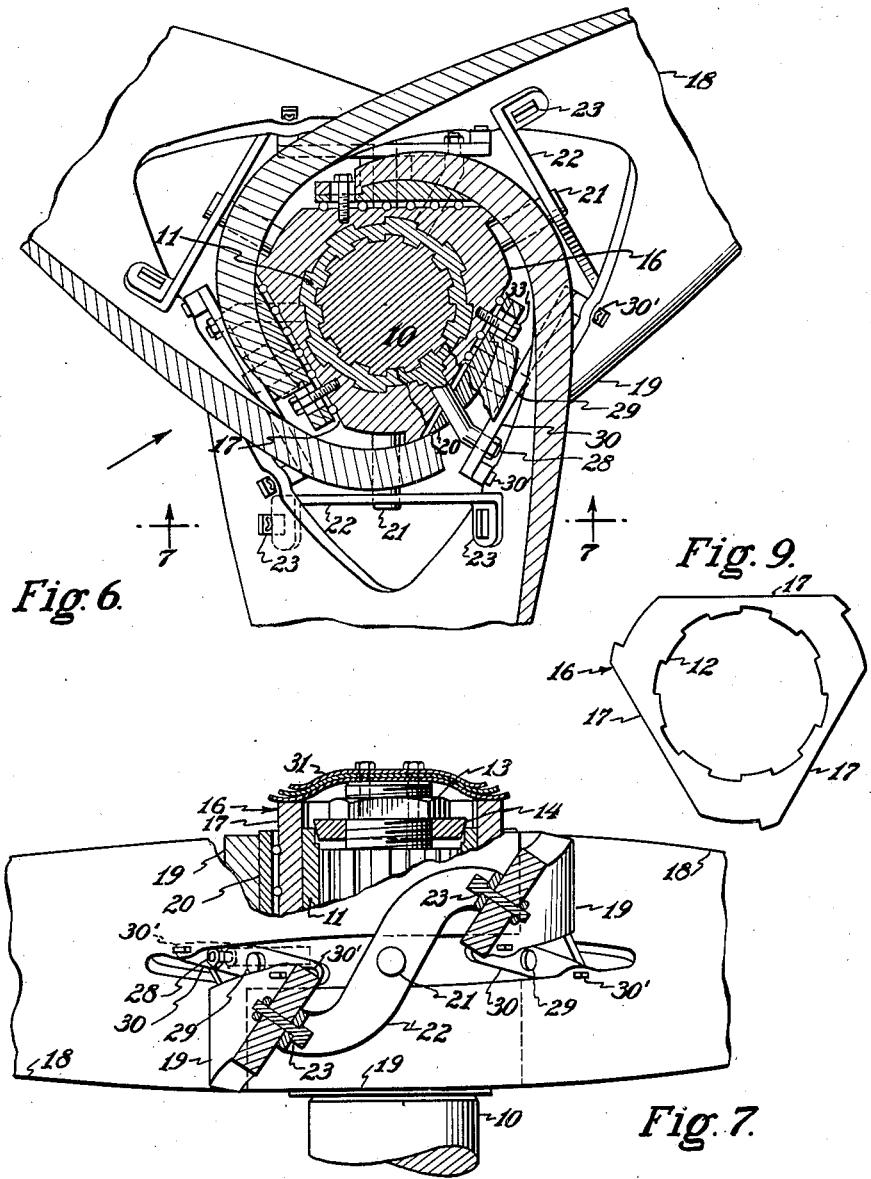

July 23, 1935. S. A. REED 2,008,771
AUTOMATIC VARIABLE PITCH PROPELLER
Filed Jan. 9, 1935 3 Sheets-Sheet 3

INVENTOR
Sylvanus A. Reed
BY
ATTORNEY

Patented July 23, 1935

2,008,771

UNITED STATES PATENT OFFICE

2,008,771

AUTOMATIC VARIABLE PITCH PROPELLER

Sylvanus A. Reed, New York, N. Y.

Application January 9, 1935, Serial No. 985

10 Claims. (Cl. 170—162)

This invention relates to aeronautical propellers of the type wherein the pitch of the propeller blades is automatically variable in flight in response to propeller thrust.

The blade structure of the propeller is generally similar to that shown in my Patents numbers 1,604,757, issued October 26, 1926, and 1,842,766, issued January 26, 1932, in which patents I show propeller blades of forged duralumin having bifurcated root ends embracing a hub, the ends on the hub side opposite the blade being inwardly curved to bear upon the hub, thereby placing the hub under compression, rather than in tension as in the usual construction.

In the present invention, a sleeve is slidably arranged on splines on a hub member, the blade ends bearing on the sleeve, and the blades being carried thereby on suitable guiding devices and anti-friction bearings, whereby the blades are rotatable through limited angles about their own axes. Portions of the blades are interconnected to assure identical pitch changes in all, the connections cooperating with an element on the hub whereby movement of the blade-carrying sleeve relative to the hub causes blade pitch changes. A strong spring acts between the sleeve and the hub, constantly urging the sleeve rearwardly to hold the blades in their high pitch position. When the propeller thrust force causes forward movement of the sleeve against the spring, the blade pitch is decreased, reducing the thrust force to a point of balance at which most efficient combined engine and propeller operation will result.

Since matters of propulsive efficiency of a power plant including an engine and a variable pitch propeller are well understood by those versed in the art, it will be deemed sufficient in this specification to point out the particular constructional features of my propeller and the advantages flowing therefrom.

Among the objects of the invention, the following are of major importance:

To provide an aeronautical propeller having blades automatically variable in pitch in response to variations in propeller thrust;

To provide a propeller having a hub and a plurality of variable pitch blades so organized with respect to the hub that blade centrifugal stresses exert compressive stresses on the hub;

To provide a hub structure including relatively slidable elements to both of which the blades are connected, so that relative movement of the hub elements causes change in the pitch of the blades;

To provide a blade construction wherein the blade root portions are subject to tensile stress, and to provide means for attaching the blades to the hub assembly, at points of high tensile stress, which will involve a minimum reduction in area in the tensilely stressed blade;

To provide, in a propeller, resilient thrust counteracting means, and devices responsive to the deflection of said resilient means for effecting blade pitch variation.

Further objects will be noted in the balance of the specification and in the drawings, in which:

Fig. 1 is a front elevation, partly in section, of the central portion of a propeller built according to this invention, and is a section on the line 1—1 of Fig. 2;

Fig. 2 is a section on the line 2—2 of Fig. 1;

Fig. 3 is a section on the line 3—3 of Fig. 1;

Fig. 4 is a side elevation of the central portion of the propeller;

Fig. 5 is a section on the line 5—5 of Fig. 1;

Fig. 6 is a view, similar to Fig. 1, showing an alternative construction involving the use of three blades;

Fig. 7 is a section on the line 7—7 of Fig. 6;

Fig. 8 is a side elevation of the central portion of the three-blades propeller;

Fig. 9 is an end elevation of the slidable hub sleeve;

Figure 10:
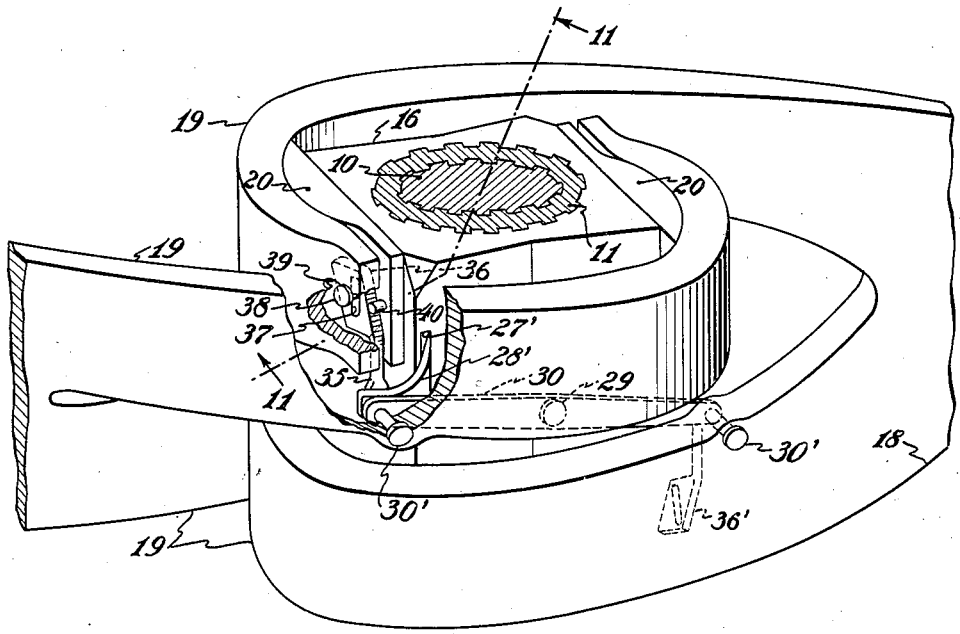
Fig. 10 is a perspective view of the propeller, partly broken away, to show an alternative blade pitch balancing and controlling mechanism.

As the principles of construction and operation of both the two- and three-bladed propellers are the same, the same numbers will designate parts of similar function in both. The normal propeller shaft 10, having splines, is fitted with a hub member 11 provided with shaft-engaging splines and with external splines 12. The hub 11 is rigidly fixed to the shaft by means of a nut 13 screwed against a tapered washer 14, the latter jamming the hub 11 firmly against a tapered abutment 15 at the rear of the shaft splines. The outer splines 12 of the hub 11 slidably carry a sleeve 16 having outer flat abutments 17. These abutments, in the case of the two-blade propeller, are opposite and parallel, and in the case of the three-blade propeller, three abutments are equally spaced around the sleeve. Blades 18 are bifurcated at their root ends, the bifurcated extensions 19 thereof being formed to pass around opposite sides of the hub assembly to bear, through the medium of bearing blocks 20, on antifriction balls between the blocks and the abutments 17. A stud 21 projects radially of the hub from the sleeve 16, passing through the block 20, of the opposite blade (in the two-blade propeller), and carrying a pivoted yoke 22 attached as at 23 to the blade body on the near side of the hub, thus holding each blade in proper axial alinement, and permitting limited rotation of the blade about its own axis with respect to the sleeve 16.

The form of joint 23 between each yoke 22 and blade 18 is most clearly shown in Fig. 5. The blade is provided with a long, narrow through opening, the long dimension thereof being parallel to the lines of tensile stress imposed on the blade. A key-like element 24 having a cross-section complementary to the blade opening, passes through a flange 25 on the yoke 22 and through the blade opening, the key having a head on one side and a ring 26 on the opposite side to firmly hold the yoke and blade together.

The sleeve 16 is provided with slots 27 (Fig. 4) through which studs 28 pass, the latter being rigid with the hub 11, and being bent at their outer ends to lie on axes normal to the blade axes. Also, studs 29 extend from the sleeve 16 with axes parallel to the axes of studs 28, and levers 30 bridge and are pivoted to each set of the studs 28 and 29, the lever on each side of the hub assembly extending to pivot joints 30' on the blade extensions 19 of oppositely extending blades.

The forward end of the shaft 10 is provided with a plurality of leaf springs 31, attached to the shaft and bearing at their ends on the forward end of the sleeve 16, tending to push said sleeve rearwardly along the splines 12 of the hub 11.

The operation of the propeller is as follows: When the propeller is at rest, the sleeve 16 will be pushed rearwardly on the hub 11, by which the studs 29 will lie as far rearwardly as possible relative to the hub studs 28. Thus, the lever 30 will be twisted clockwise (Fig. 4), holding the blade extensions 19 toward one another in the high pitch position. As the engine is started, and as the thrust of the propeller increases, the blades, carrying with them the sleeve 16, move forwardly on the hub 11, causing a reduction in blade pitch. This permits maximum thrust during take-off of the aircraft. When the aircraft assumes level flight, the engine throttle will be partly closed by the pilot, whereby less power is developed. Thereupon, the springs 31 will force the sleeve 16 rearwardly, increasing the blade pitch to the extent that the resultant propeller thrust is balanced by the springs 31. The tendency will then be for the propeller to at all times develop the maximum thrust possible for any given engine throttle setting, whereby the propeller utilizes efficiently all the available engine power.

In connection with the mounting of the blades 18 on the sleeve 16, the hook-like ends of the extensions 19, and the bearing blocks or pads 20, are provided with a slotted opening 32 through which a bolt 33 passes to be screwed into the sleeve 16. The bolt head bears on a flat surface 34 milled in the blade end, holding the blade and block against the sleeve 16, while permitting movement of the blade relative to the sleeve for changes in pitch.

Figures 11, 12:
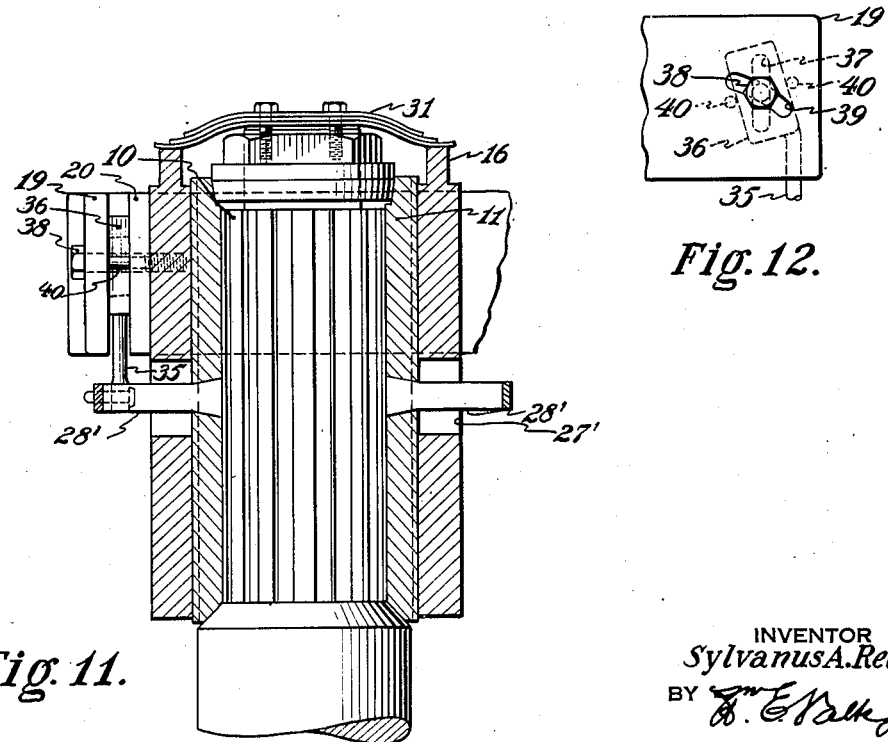
Fig. 11 is an axial section on the line 11—11 of Fig. 10.
Fig. 12 is a plan of part of the mechanism of Figs. 10 and 11.

In Figs. 10, 11 and 12, I show an improved form of blade pitch balancing and controlling mechanism in which the stud 28 is replaced by a plate 28', fast to the hub 11, and extending through a slot 27' in the sleeve 16 to the pivot joint 30' of the balancing lever 30. A link 35 is pivoted to 30' carrying at its end a slotted plate 36 within the slot 37 of which a pin 38 passes to screw firmly into the sleeve 16. The plate 36 lies between the hook end of the blade extension 19 and the bearing block 20, the pin 38, besides passing through the slot 37, passing also through arcuate slots 39 formed in the hook end of the blade 19 and the block 20. Pins 40 bear on the lateral sides of the plate 36, these pins being set into the adjacent portions of the blade end 19 and the block 20. As will be seen in Fig. 12, the sides of the plate 36 are inclined with respect to the plate slot 37 so that when the plate is moved slotwise along the pin 38, under the influence of movement of the sleeve 16 relative to the hub 11, the plate is piloted by the pin 38, and the cam sides of the plate bear upon the pins 40. Thereby, the blade end 19 is forced to move relative to the pin 38, the path of such movement being governed by the shape of the arcuate slot 39. This slot is concentric with the blade axis so that the indicated blade movement constitutes changes in propeller pitch. By the above described mechanism, the pitch changing force is applied not only at the edges of the blade shanks where they join the pins 30', but also to the hook end of each blade, at a point close to its compressive bearing on the sleeve 16. This same cam arrangement including the elements 35-40, inclusive, is duplicated for the other hook of the blade hook in which said elements are shown, and for each hook of the other blade or blades (one such element being indicated at 36').

The pin 38 is provided with a head as shown, the head bearing on the outer face of the blade extension 19, thereby acting to hold the blade from axial movement away from the propeller hub.

There are four of these cams 36 in a two-blade propeller, one for each fork of the blades. There would be six in a three-blade propeller.

Wherever there is play in an aperture provided for a bolt or pin, such aperture is slotted to allow for such play.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aeronautical propeller, a hub member, a sleeve slidable therealong, resilient means acting between said hub and said sleeve for urging the latter rearwardly, propeller blades attached to said sleeve for axial rotation relative thereto, and for movement therewith, a connection between said hub and said blades for changing the blade pitch upon movement of said sleeve relative to said hub, said blades having extensions embracing said sleeve, and pivot means on opposite sides of the sleeve and engaging each said blade for holdng the blades in radial relation relative to said sleeve.

2. In an aeronautical propeller, a hub member having a stud extending substantially radially therefrom, a sleeve slidable along said hub having a slot within which said stud engages, a blade mounted on said sleeve for slight twisting of the blade on its longitudinal axis, and a link connecting said stud with a point on said blade remote from its longitudinal axis, so arranged and constructed that movement of said sleeve relative to said hub effects a pitch change in said blade.

3. In an aeronautical propeller, a hub member having a stud extending substantially radially therefrom, a sleeve slidable along said hub having a slot within which said stud engages, a blade mounted on said sleeve for slight twisting of the blade on its longitudinal axis, a link connecting said stud with a point on said blade remote from its longitudinal axis, so arranged and constructed that movement of said sleeve relative to said hub effects a pitch change in said blade, and means for constantly resiliently urging said blade toward a high pitch position.

4. In an aeronautical propeller having a hub adapted to rotate on a drive shaft, a sleeve splined to said hub for rotation therewith and for translation thereon, spring means urging said sleeve rearwardly on said hub, a blade having a bifurcated root embracing said sleeve, the root ends bearing on the opposite side of said sleeve from which the blade extends, means for fixedly locating the blade axis relative to said sleeve, and means connecting said hub with a portion of one said root end, so arranged and constructed that during movement of said sleeve, with the blade, along said hub, said connecting means effects twisting of the blade about its longitudinal axis.

5. In an aeronautical propeller comprising a hub, a metal blade having a bifurcated root portion, the bifurcations being extended around and bearing on said hub on the side thereof opposite the main blade portion, a pin on said hub coaxial with the blade axis on the blade side of said hub, a yoke pivoted on said pin, said blade bifurcations each having an elongated opening therein the longer dimension of which is substantially parallel to the blade axis, and means, elongated in cross-section in correspondence with the shape of said openings for joining the ends of said yoke to said blade bifurcations.

6. In a propeller, a hub, an elongated blade extending therefrom subject to tension, said blade having an elongated opening with the lesser dimension normal to the direction of tension, whereby a minimum reduction in cross-sectional area is effected by said opening, and means complementary to, and engaging within said opening for attaching said blade to said hub.

7. In a metal propeller including a hub and a blade whose roots are divided and bent inward towards one another to embrace said hub, said blades having play for rotation about their own axes relative to said hub, a member slidable longitudinally of said hub by which said blades are carried, linkage connecting said hub with said blades, and resilient means between said hub and said slidable member for urging the latter toward one extreme of its movement relative to said hub.

8. In a metal propeller including a hub sleeve and a blade whose root is divided, the divided portions being bent inwards towards one another to embrace said sleeve, said blade having play for rotation about its own axis relative to said sleeve, means for locating said blade for said rotation relative to said sleeve, said blade extensions having a slotted opening, means passing through said opening and engaging said sleeve for holding said blade from radial displacement relative to said hub while allowing said rotational blade play and means for controlling the rotational play of said blade relative to said sleeve.

9. In an aeronautical propeller, a shaft, a sleeve mounted for sliding thereon, a propeller blade having a root portion embracing said sleeve, the blade proper extending substantially radially from said sleeve, radially extending means on diametrically opposite sides of said sleeve engaging portions of the blade adjacent thereto for holding said blade in radial position relative to said sleeve, said blade being oscillatable on said radial means, a member fixed to said shaft, and connections from said member to points on said blade remote from the blade axis, so organized and arranged as to turn said blade on said radial means in response to sliding of said sleeve upon said shaft.

10. The combination in an aeronautical propeller of a shaft, a sleeve slidable thereon, a propeller blade embracing said sleeve and pivoted thereto on diametrically opposed sides of the sleeve, said blade being organized for limited oscillation on said pivots with respect to said sleeve, and means connecting said shaft with points on said blade on opposite sides of said sleeve for oscillating said blade about said pivots in response to sliding of said sleeve along said shaft.

SYLVANUS A. REED.